Nov. 29, 1927.  
W. A. SCHMITT  
PULLER  
Filed May 12, 1927  
1,650,964
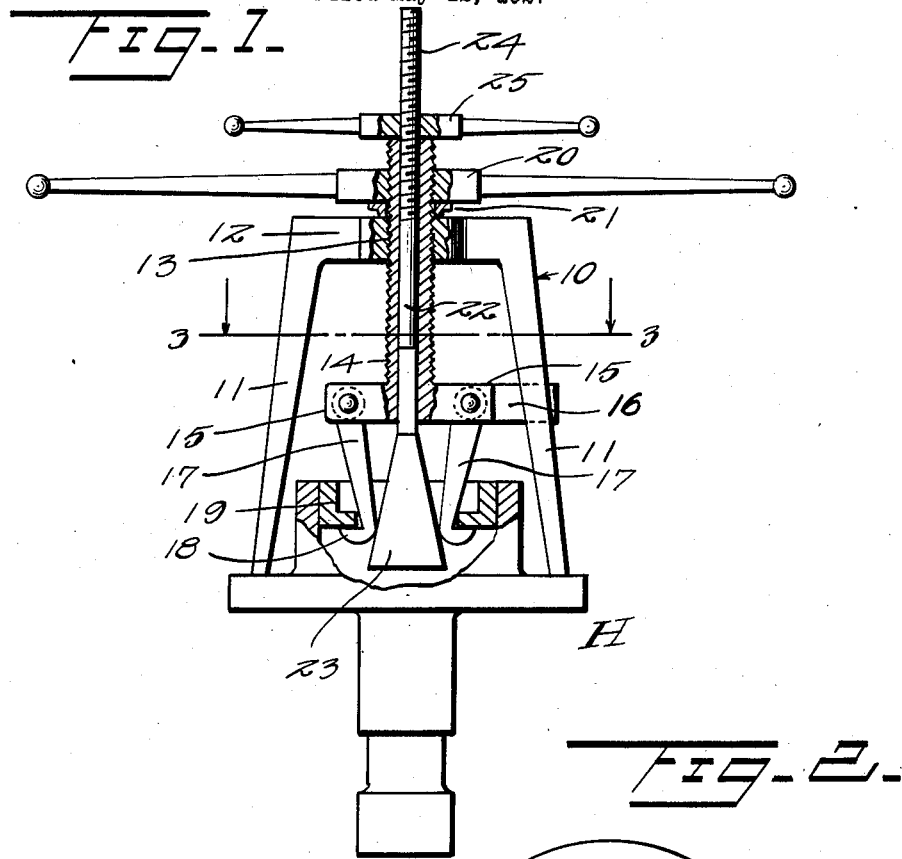
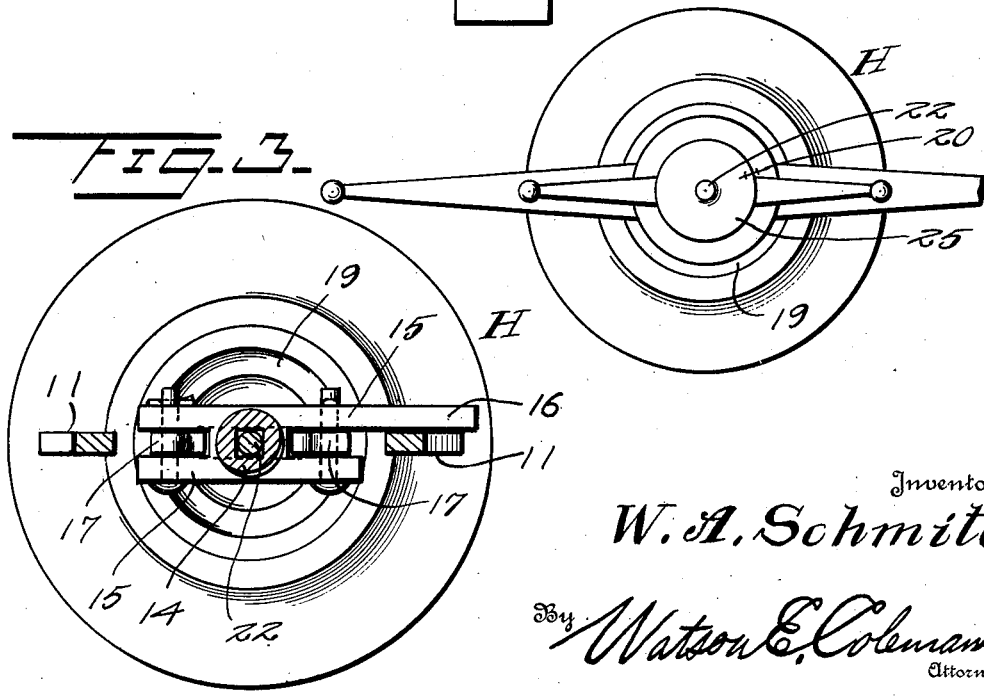
Inventor  
W. A. Schmitt  
By Watson E. Coleman  
Attorney Patented Nov. 29, 1927.

1,650,964

UNITED STATES PATENT OFFICE.

WILLIAM A. SCHMITT, OF MEREDOSIA, ILLINOIS.

PULLER.

Application filed May 12, 1927. Serial No. 190,818.

This invention relates to pullers and more particularly to a device of this character for extracting the bearing cups of roller bearings from the hubs of automobile wheels.

An important object of the invention is to provide a device of this character which is readily engaged with both the wheel and cup and which will exert a steady and powerful pull upon the cup to remove the same.

A further object of the invention is the provision in a construction of this character of positive means for preventing disengagement of the pulling apparatus from the cup during the pulling operation.

These and other objects I attain by the construction shown in the accompanying drawings, wherein for the purpose of illustration is shown a preferred embodiment of my invention and wherein:—

Figure 1 is a side elevation partially in section of a puller constructed in accordance with my invention showing the same applied to remove the bearing cup of an automobile wheel;

Figure 2 is a plan view of the puller;

Figure 3 is a section on the line 3—3 of Figure 1.

Referring now more particularly to the drawings, the numeral 10 designates a substantially U-shaped frame, the arms 11 of which are adapted to engage against an auto wheel hub H when the cross bar 12 thereof is opposed to the axis of this hub. This cross bar has an opening 13 formed therein axially aligning with the hub through which is directed the threaded shank 14 of a pulling screw, the inner or hub confronting end of which has diametrically opposed pairs of spaced arms 15. One of these arms 15 is elongated, so that it engages an arm 11, as indicated at 16, so that relative rotation of the pulling screw and the U-shaped standard is prevented. Pivoted between each pair of arms is a dog 17, the lower end of which is in the form of an outwardly facing hook adapted to engage the inner face of the bottom of a bearing cup 19. The stem 14 above the cross bar has mounted thereon a lever nut 20, whereby it may be drawn through the opening 13, and between this lever nut and the cross bar 12, a thrust washer 21 is preferably disposed. The stem 14 is tubular and has directed therethrough the stem 22 of a wedge 23, which extends between the lower ends of the arms 17 and when moved upwardly between these arms forces these lower ends apart. This stem at its lower end is splined to the stem 14 of the pulling screw and at its upper end is threaded, as indicated at 24. This threaded upper end projects above the upper end of the stem 14 and has mounted thereon a lever nut 25, by means of which it may be drawn upwardly.

It will be obvious that by positioning the hooks 18 against the cup bottom and moving the stem 22 upwardly, the wedge 23 will engage these hooks and prevent their withdrawal from the cup bottom, so that there is no danger of the puller slipping in operation. With the hooks locked against disengagement, pressure may be applied to the cup by rotation of the lever nut 20.

Since the construction hereinbefore set forth is capable of a certain range of change and modification without materially departing from the spirit of the invention, I do not limit myself to such specific structure except as hereinafter claimed.

I claim:—

1. In a puller for removing bearing cups from the hubs of vehicle wheels and the like, a standard having an opening formed therethrough and having legs for engagement against the wheel hub, a pulling screw directed through the opening of the standard and having at its lower end pairs of arms one of which has engagement with a leg of the standard preventing relative rotation of the screw and standard, dogs pivoted between the arms of each pair and having at their free ends hooks for engagement with the bearing cup and means for forcibly maintaining said dogs in separated relation.

2. In a puller for removing bearing cups from the hubs of vehicle wheels and the like, a standard having an opening formed therethrough and having legs for engagement against the wheel hub, a pulling screw directed through the opening of the standard and having at its lower end pairs of arms one of which has engagement with a leg of the standard preventing relative rotation of the screw and standard, dogs pivoted between the arms of each pair and having at their free ends hooks for engagement with the bearing cup, said pulling screw being tubular, a wedge positioned between the free ends of said dogs and having a stem extending through and means at the upper end of the wedge stem and engaging the pulling screw for drawing the wedge stem upwardly through the pulling screw.

3. In a puller for removing bearing cups from the hubs of vehicle wheels and the like, a standard having an opening formed therethrough and having legs for engagement against the wheel hub, a pulling screw directed through the opening of the standard and having at its lower end pairs of arms one of which has engagement with a leg of the standard preventing relative rotation of the screw and standard, dogs pivoted between the arms of each pair and having at their free ends hooks for engagement with the bearing cup, said pulling screw being tubular, a wedge positioned between the free ends of said dogs and having a stem extending through and means at the upper end of the wedge stem and engaging the pulling screw for drawing the wedge stem upwardly through the pulling screw, said wedge stem having engagement with the pulley screw preventing relative rotation thereof.

In testimony whereof I hereunto affix my signature.

WILLIAM A. SCHMITT.